US011110755B2

United States Patent
Givens

(10) Patent No.: US 11,110,755 B2
(45) Date of Patent: Sep. 7, 2021

(54) TREAD WEAR PROFILE TOOL

(71) Applicant: Bridgestone Americas Tire Operations, LLC, Nashville, TN (US)

(72) Inventor: Samuel O. Givens, Copley, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 129 days.

(21) Appl. No.: 16/774,726

(22) Filed: Jan. 28, 2020

(65) Prior Publication Data

US 2020/0262250 A1    Aug. 20, 2020

Related U.S. Application Data

(60) Provisional application No. 62/807,277, filed on Feb. 19, 2019.

(51) Int. Cl.
| | |
|---|---|
| *B60C 11/24* | (2006.01) |
| *B60C 11/03* | (2006.01) |
| *G01M 17/02* | (2006.01) |
| *B60C 11/00* | (2006.01) |
| *B60C 11/01* | (2006.01) |

(52) U.S. Cl.
CPC .............. *B60C 11/24* (2013.01); *B60C 11/00* (2013.01); *B60C 11/01* (2013.01); *B60C 11/03* (2013.01); *B60C 11/0309* (2013.01); *G01M 17/02* (2013.01); *B60C 2011/0358* (2013.01)

(58) Field of Classification Search
CPC ......... B60C 11/24; B60C 11/00; B60C 11/01; B60C 11/03; B60C 11/0309; B60C 2011/0358; G01M 17/02
See application file for complete search history.

(56) References Cited

U.S. PATENT DOCUMENTS

| | | | |
|---|---|---|---|
| 4,631,831 A | 12/1986 | Bacher | |
| 5,303,756 A * | 4/1994 | Hill | B60C 11/24 152/154.2 |
| 6,151,959 A * | 11/2000 | Cantu | B60C 11/12 73/146 |
| 6,789,416 B1 | 9/2004 | Tracy | |

(Continued)

FOREIGN PATENT DOCUMENTS

| | | |
|---|---|---|
| FR | 2791426 B1 | 5/2001 |
| WO | 1998034090 A1 | 8/1998 |
| WO | 2018115675 A1 | 6/2018 |

OTHER PUBLICATIONS

FR2791426B1 English Machine Translation.
WO1998034090 English Machine Translation.
WO2018115675A1 English Machine Translation.

*Primary Examiner* — Eman A Alkafawi
*Assistant Examiner* — Aeysha N Sultana

(57) ABSTRACT

A tread wear profile tool for determining wear of a tire is provided, the tool comprising: a body having: a substantially planar shape, at least one groove index member extending distally from the body, wherein the at least one groove index member includes at least one traction element wear gauge, at least one traction element measurement member oriented on a distal edge of the body, and a distal profile; a tire having: a tread having a radially outer profile, the tread having at least one groove, at least one traction element, and two shoulders; and wherein: the distal profile of the body is a negative of the radially outer profile of the tread.

20 Claims, 11 Drawing Sheets

(56) References Cited

U.S. PATENT DOCUMENTS

| | | |
|---|---|---|
| 7,269,997 B2 | 9/2007 | Dale, Jr. |
| 7,295,328 B2 | 11/2007 | Uehara |
| 7,469,579 B2 | 12/2008 | Iwase |
| 7,578,180 B2 | 8/2009 | Lionetti |
| 8,625,105 B2 | 1/2014 | Pryce |
| 2005/0044943 A1* | 3/2005 | Godeau ............... B60C 11/24 73/146 |
| 2014/0246134 A1* | 9/2014 | Hironaka ............ B60C 11/24 152/154.2 |
| 2018/0207996 A1* | 7/2018 | Serva ................... B60C 11/04 |
| 2019/0180505 A1* | 6/2019 | Zoken .................. G06T 17/20 |

* cited by examiner

TREAD WEAR PROFILE TOOL

CROSS-REFERENCE TO RELATED APPLICATIONS

This application claims priority from U.S. Provisional Patent Application No. 62/807,277, filed on Feb. 19, 2019, which is incorporated by reference herein in its entirety.

BACKGROUND

Tires are consumable products. Particularly, as a tire is used on a road surface, and particularly on an asphalt road surface, the tire experiences wear in its tread region. Tires have a finite wear life in their tread region.

Additionally, a tire's tread does not always wear evenly. Uneven tread wear is often a result of some problem in the adjustment or configuration of the vehicle, its suspension, or in the tire itself. For example, a tire with increased wear on a single outer edge of its tread may indicate an issue in the alignment of the suspension to which a tire and wheel assembly is mounted. As another example, a tire with increased wear on both outer edges of its tread may indicate a tire that has been operated below its recommended tire pressure. As a final example, a tire with increased wear in a center region of its tread may indicate a tire that has been operated above its recommended tire pressure.

Determining the wear of a tire simply by looking at it without a reference is often quite difficult if not impossible. Tire tread depth gauges may be used to determine tread wear, but these gauges require application to each groove of each tire, and as a result, users are reluctant to spend the required time to review and document tread wear. It should be noted that some vehicles may have to have tread wear measured and documented on a regular basis for compliance with safety standards or regulations, and often these vehicles may have as many as 18 tires, or even more.

Accordingly, what is needed is a tread wear profile tool that allows for the quick, easy, and in some aspects, automated, determination and/or documentation of tread wear.

SUMMARY

In one embodiment, a tread wear profile tool for determining wear of a tire is provided, the tool comprising: a body having: a substantially planar shape, at least one groove index member extending distally from the body, wherein the at least one groove index member includes at least one traction element wear gauge, at least one traction element measurement member oriented on a distal edge of the body, and a distal profile; a tire having: a tread having a radially outer profile, the tread having at least one groove, at least one traction element, and two shoulders; and wherein: the distal profile of the body is a negative of the radially outer profile of the tread.

In another embodiment, a tread wear profile tool for determining wear of a tire is provided, the tool comprising: a body having: a substantially planar shape, at least one groove index member extending distally from the body, at least one wear gauge; at least one traction element wear finger having a distal end and a proximal end, wherein the at least one traction element wear finger is an elongated element having a longitudinal length that extends parallel to the body, wherein the at least one traction element wear finger is contained within a retention member connected to the body, and wherein the at least one traction element wear finger slides longitudinally along a longitudinal axis of the at least one traction element wear finger; and a tire having: a tread having a radially outer profile, the tread having at least one groove, at least one traction element, and two shoulders.

BRIEF DESCRIPTION OF THE DRAWINGS

The accompanying figures, which are incorporated in and constitute a part of the specification, illustrate various example embodiments, and are used merely to illustrate various example embodiments. In the figures, like elements bear like reference numerals.

DETAILED DESCRIPTION

Figure 1A:
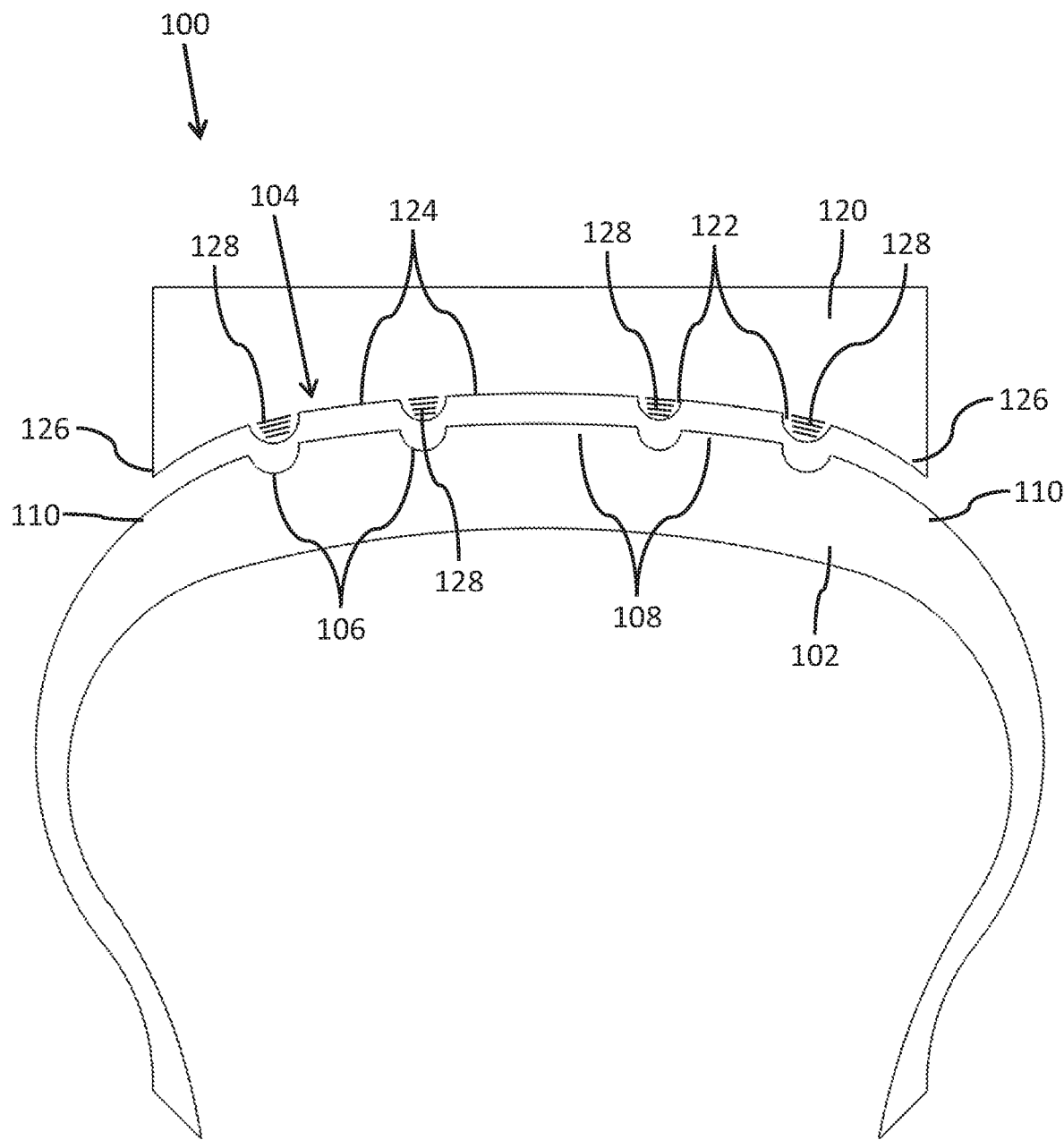
FIG. 1A illustrates a sectional view of a tread wear profile tool 100 oriented adjacent to a tire 102.

Most tires have unique tread profiles. The tread profile is a profile of the tread surface observed in a sectional view of the tire, such as tire 102 illustrated in FIG. 1A. FIGS. 1A-1D illustrate a tread wear profile tool 100 in use with an unworn tire 102. The tread 104, and thus its profile, may include at least one groove 106, which may extend in a circumferential direction of tire 102, an axial direction of tire 102, or may extend in a direction biased from the circumferential and axial directions of tire 102. Tread 104, and thus its profile, may include at least one traction element 108, which may include a rib, block, or a combination of ribs and blocks. Tread 104, and thus its profile, includes two shoulders 110 oriented on the axially outer edges of tread 104.

At least one groove 106, at least one traction element 108, and shoulders 110 may form a tread profile of tread 104 at one or more specific circumferential location. As noted above, this tread profile may be unique to tire 102 and other tires 102 of the same size molded using the same or identical tread molds. Likewise, tool 100 may be unique to this specific tread profile at this specific circumferential location. As a result, tire 102 may include a mark or other indication specifying the specific circumferential location or locations where a user is to apply tool 100 to tread 104. For example, tire 102 may include one or more marks on its sidewall indicating the circumferential position(s) at which a user is to apply tool 100 to tread 104 to determine tread wear. This same concept may apply to tools 200, 300, 400, and 500 discussed below.

Alternatively, at least one groove 106, at least one traction element 108, and shoulders 110 may form a tread profile of tread 104 that is the same regardless of circumferential location. Such a profile of tread 104 may exist where grooves 106 and traction elements 108 are circumferential with a constant width and orientation. Tool 100 may be applied by user to tread 104 at any point about the circumference of tire 102. This same concept may apply to tools 200, 300, 400, and 500 discussed below.

A tread wear profile tool 100 may be created to act as a negative of the tread profile of tire 102, with positive elements (e.g., groove index members 122 and shoulder index members 126) corresponding with grooves 106 and shoulders 110, and negative elements (e.g., traction element measurement members 124) corresponding with traction elements 108 when tread 104 is in an unworn state. That is, a distal profile of tool 100 may match, as a negative, the radially outer profile of tread 104.

In this manner, a unique tool 100 may be created to correspond to tire 102. It is understood that tool 100 may refer to a plurality of identical tools 100 that correspond to a plurality of tires 102, all created using the same tread mold and in the same tire size. This same concept may apply to tools 200, 300, 400, and 500 discussed below.

Tread wear profile tool 100 may include a body 120 that may be a planar element or substantially planar element. One groove index member 122 may extend distally from body 120 for each groove 106 of tire 102 corresponding to tool 100. One traction element measurement member 124 may be oriented on the distal edge of body 120 for each traction element 108 of tire 102 corresponding to tool 100. Two shoulder index members 126 may extend distally from body 120 for each shoulder 110 of tire 102 corresponding to tool 100. Groove index members 122 may extend distally past traction element measurement members 124. Shoulder index members 126 may extend distally past traction element measurement members 124.

Tread wear profile tool 100 may include at least one traction element wear gauge 128. Wear gauge 128 may comprise a plurality of markers against which the height of at least one traction element 108 may be measured. The plurality of markers may include a series of elements oriented radially to measure the radial wear of traction element 108. The plurality of markers may include a series of linear elements, a series of dots, or the like spaced apart in a radial direction (that is, spaced in a direction of corresponding to the radial direction of tire 102 when tool 100 is applied to tire 102). Each of the plurality of markers in a single wear gauge 128 may be color-coded, numbered, lettered, or the like. Each of the plurality of markers in a single wear gauge 128 may be differentiated from one another in any manner that is easy for a user to compare to the tread height of an adjacent traction element 108, so as to allow a user to determine the wear of traction element 108. In the case of color-coding, the more proximal markers indicating less wear may be a first color, such as green, whereas the more distal markers indicating more wear may be a second color, such as red, indicating to a user that tire 102 should be replaced. A third color may be used for radially intermediate markers (radially between the distal markers and the proximal markers), such as yellow, indicating to a user that tire 102 will be in need of replacement soon.

One wear gauge 128 may be oriented on each groove index member 122. One wear gauge may likewise be oriented on each shoulder index member 126.

These same concepts regarding wear gauge 128 may apply to tools 200 and 300, discussed below, and may also apply to wear gauge 440 in tool 400 discussed below.

Figure 1B:
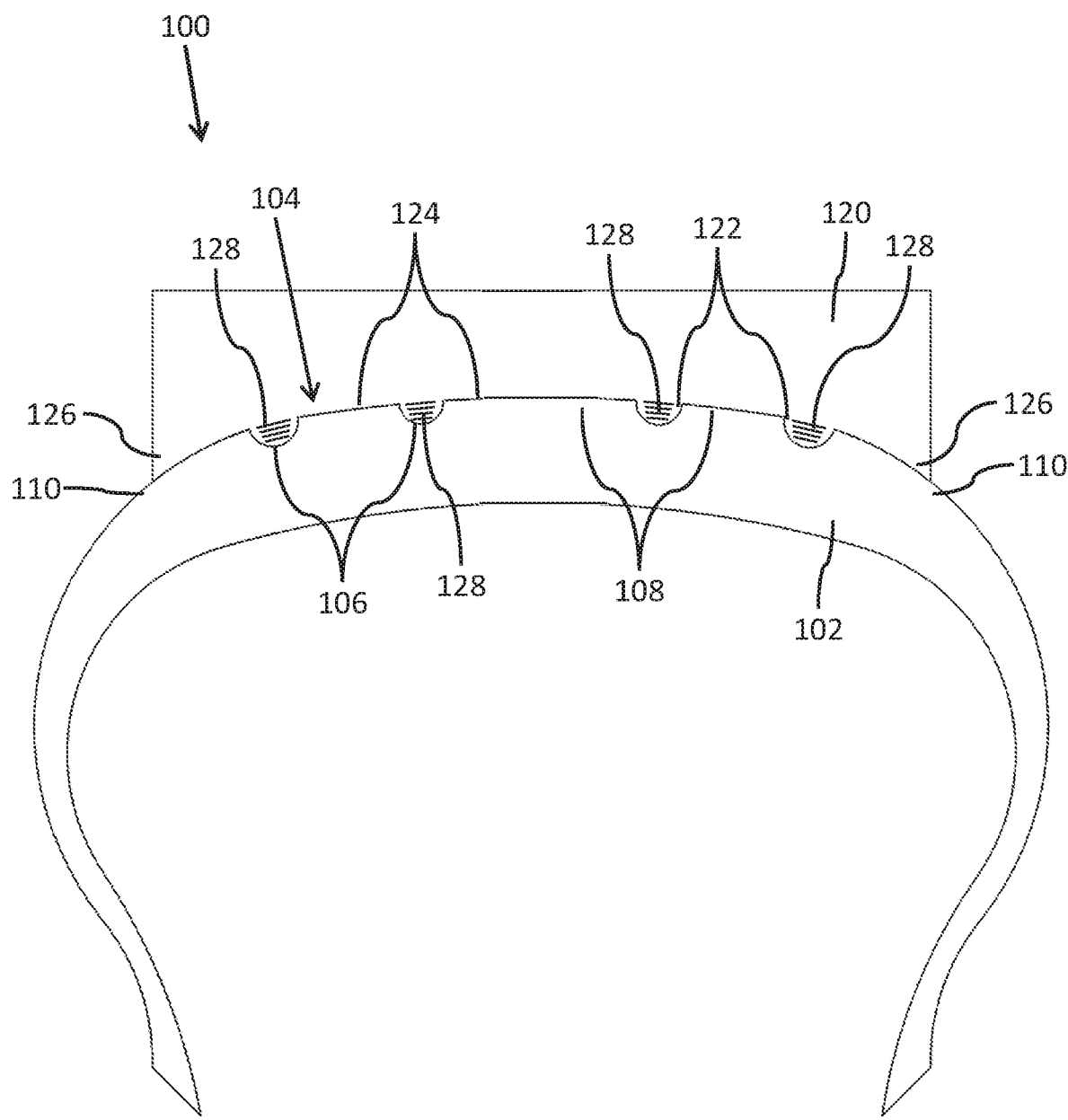
FIG. 1B illustrates a sectional view of a tread wear profile tool 100 oriented in contact with tire 102.
Figure 1C:
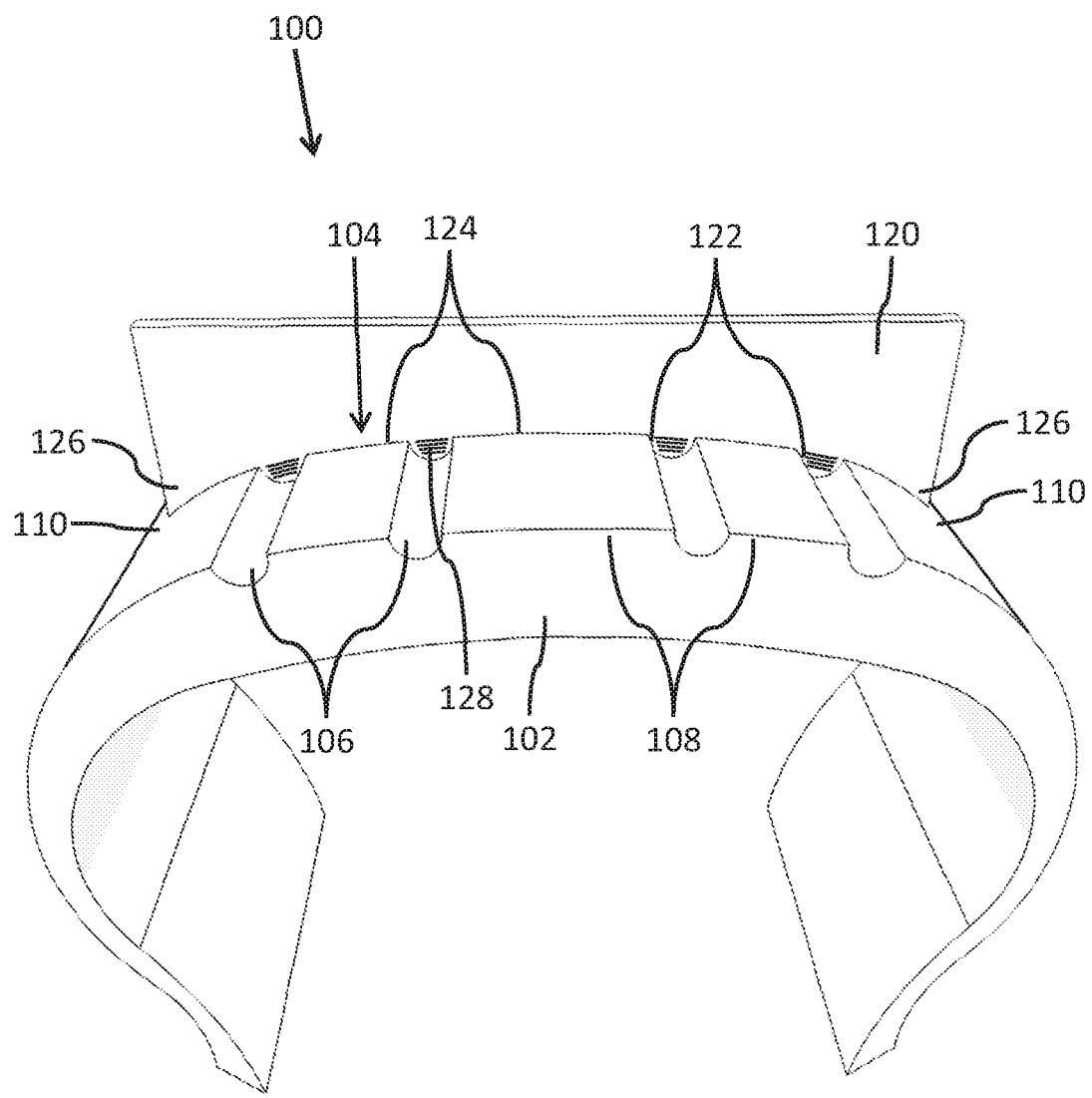
FIG. 1C illustrates a front perspective view of a tread wear profile tool 100 oriented in contact with tire 102.
Figure 1D:
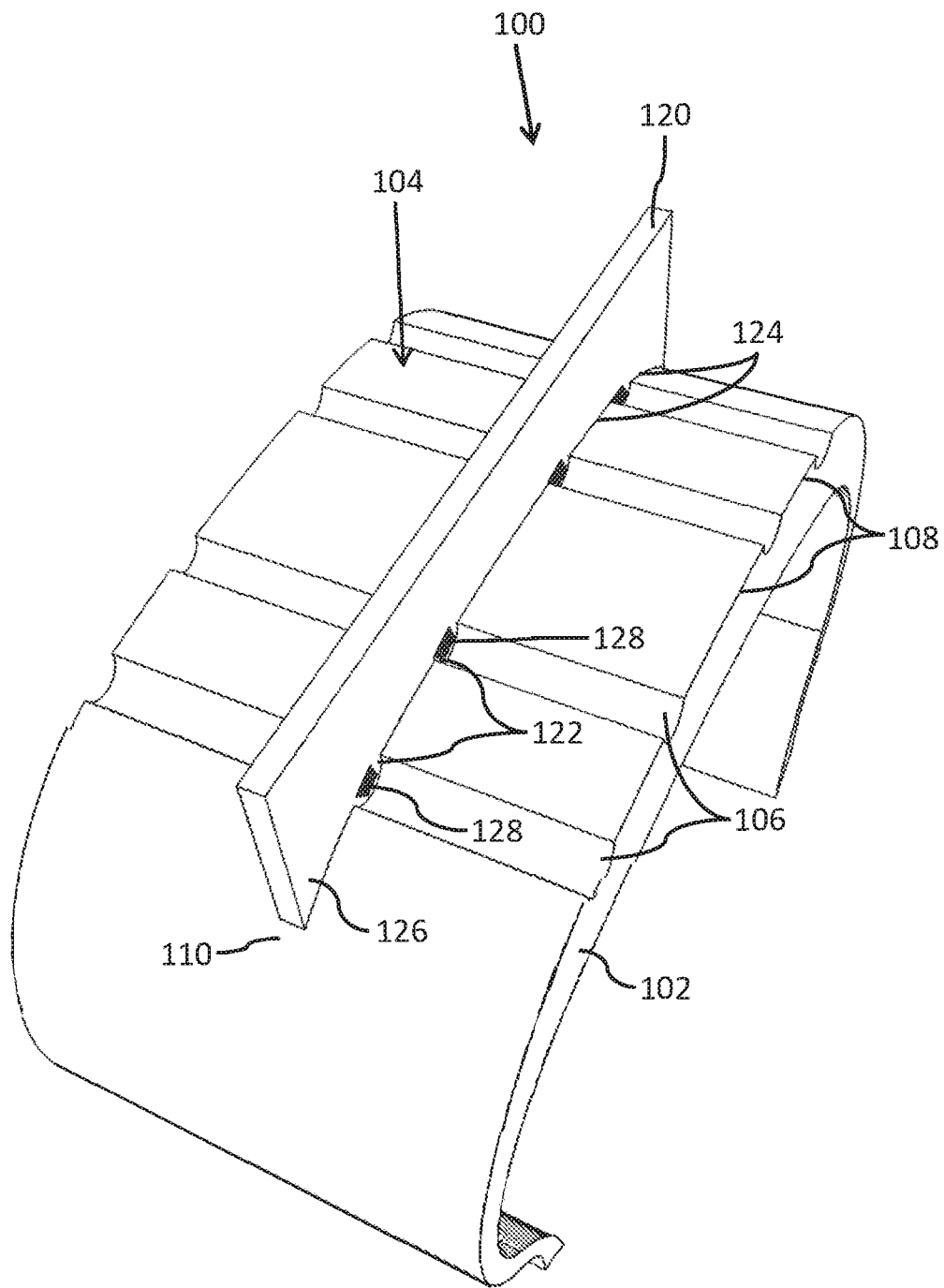
FIG. 1D illustrates a side perspective view of a tread wear profile tool 100 oriented in contact with tire 102.

As illustrated in FIG. 1B, at least the distal ends of groove index members 122 are oriented in contact with at least the radially inner portion of grooves 106. As illustrated in FIG. 1B, the entire distal edge of tool 100 may be in contact with the entire radially outer profile of tread 104 when tire 102 and tread 104 is in an unworn state. That is, the entire edge of each groove index member 122 is in contact with the entire radially outer profile of each corresponding groove 106, the entire edge of each traction element measurement member 124 is in contact with the entire radially outer profile of each traction element 108, and the entire distal edge of each shoulder index member 126 is in contact with each shoulder 110. Stated differently, groove index member 122 may have the same sectional profile as groove 106. This same concept may apply to tools 200, 300, 400, and 500 discussed below.

As tread 104 wears, its traction elements 108 will wear away and decrease in radial height, and the radially outer profile of one or more traction elements 108 will no longer completely contact the one or more corresponding traction element measurement member 124. However, in ordinary use of tire 102, and barring some excessive damage to tire 102, the distal ends of groove index members 122 will contact the radially inner portions of grooves 106, unless tread 104 is worn radially inward past grooves 106. In such a case, tire 102 would be well beyond its serviceable life, but shoulder index members 126 should still contact shoulders 110 to provide a user with an indication of the wear of tread 104. This same concept may apply to tools 200, 300, 400, and 500 discussed below.

Tool 100 (as well as tools 200, 300, 400, and 500 discussed below) may be made of any of a plurality of materials, including for example a polymer, a metal, cardboard, and the like.

A tool 100 may be included with each tire sold to a user, each set of tires sold to a user, or the like. In this manner, a user may maintain a tool 100 corresponding to one or more tire 102 mounted on a vehicle. This same concept may apply to tools 200, 300, 400, and 500 discussed below.

Figure 2A:
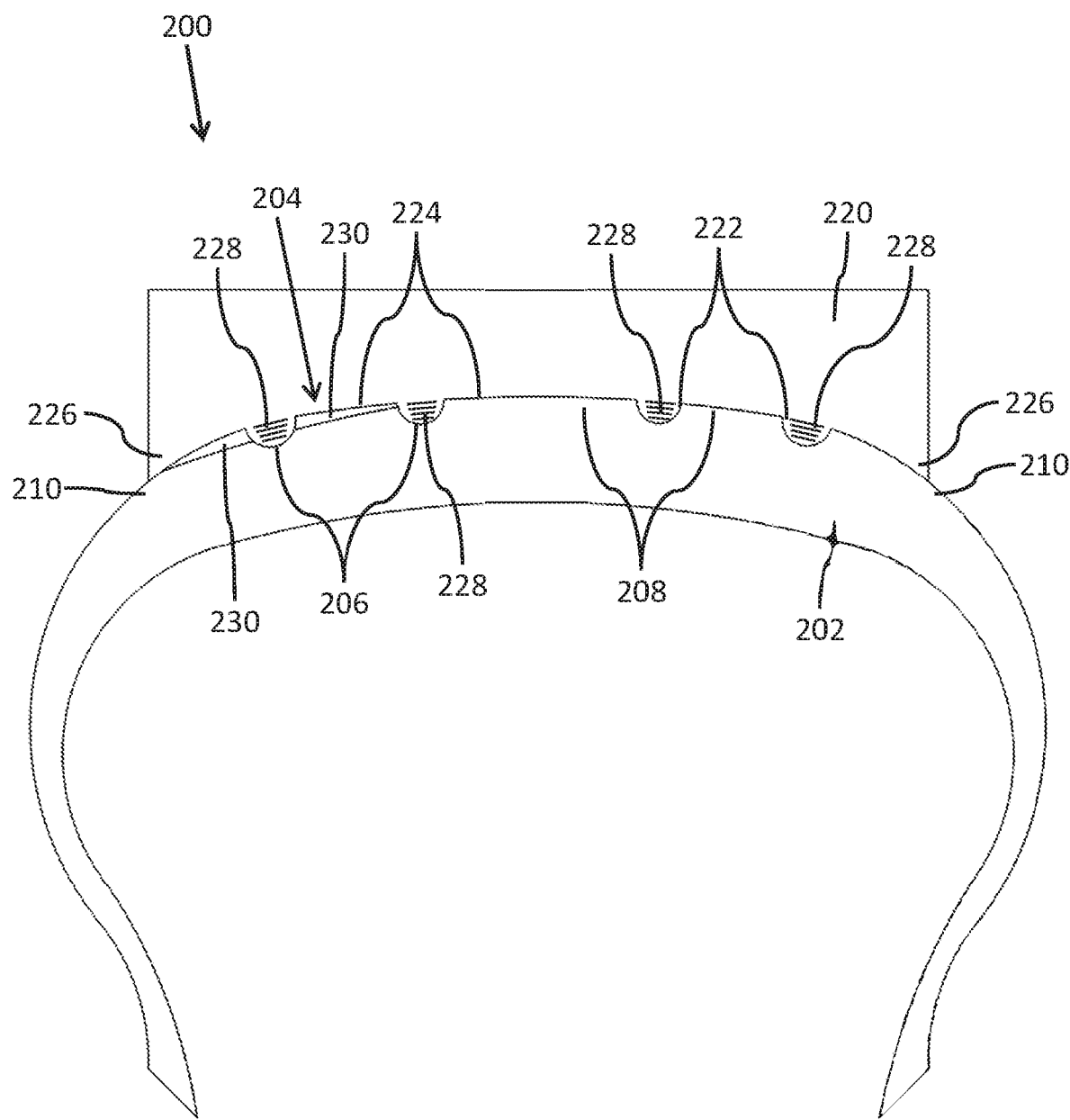
FIG. 2A illustrates a sectional view of a tread wear profile tool 200 oriented in contact with a tire 202.
Figure 2B:
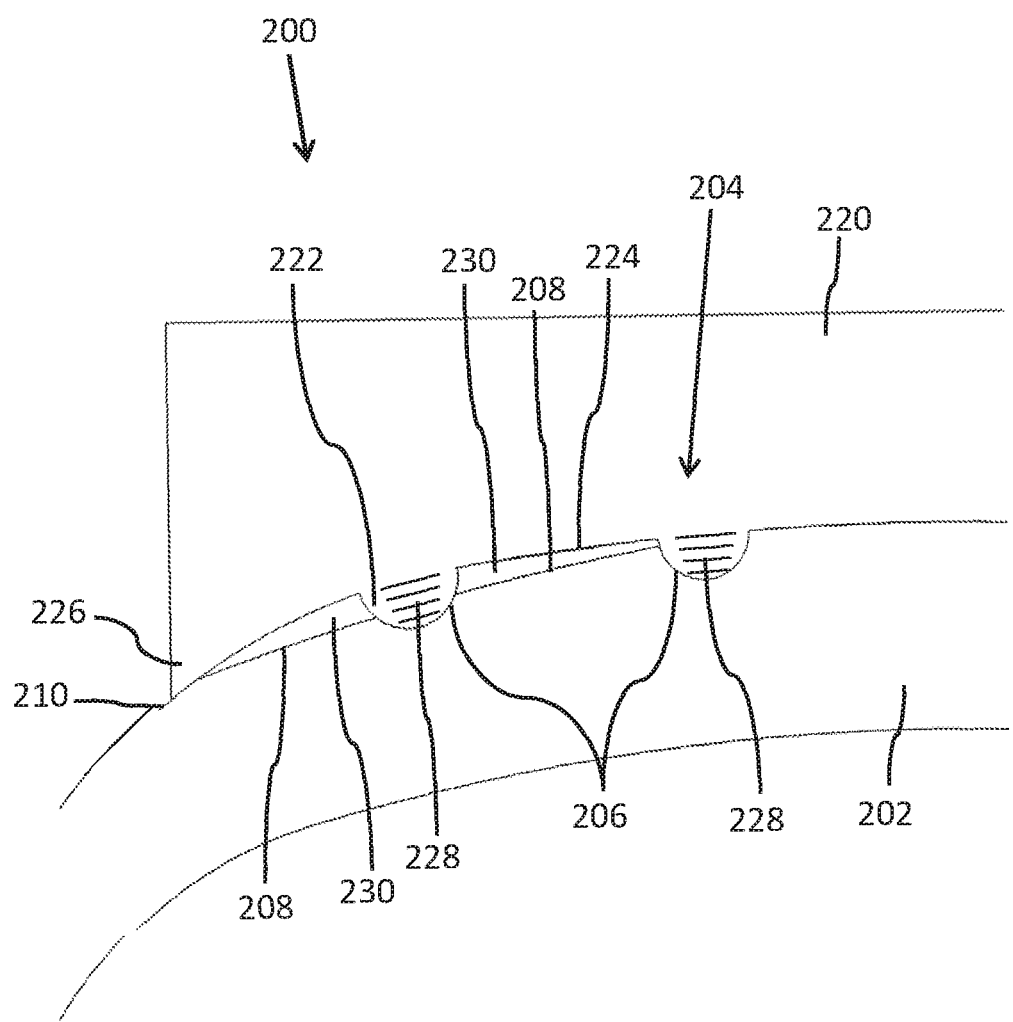
FIG. 2B illustrates a partial sectional view of a tread wear profile tool 200 oriented in contact with tire 202.

FIGS. 2A-2B illustrate a tread wear profile tool 200 in use with a worn tire 202. The tread 204, and thus its profile, may include at least one groove 206, which may extend in a circumferential direction of tire 202, an axial direction of tire 202, or may extend in a direction biased from the circumferential and axial directions of tire 202. Tread 204, and thus its profile, may include at least one traction element 208, which may include a rib, block, or a combination of ribs and blocks. Tread 204, and thus its profile, includes two shoulders 210 oriented on the axially outer edges of tread 204.

Tread wear profile tool 200 may include a body 220 that may be a planar element or substantially planar element. One groove index member 222 may extend distally from body 220 for each groove 206 of tire 202 corresponding to tool 200. One traction element measurement member 224 may be oriented on the distal edge of body 220 for each traction element 208 of tire 202 corresponding to tool 200. Two shoulder index members 226 may extend distally from body 220 for each shoulder 210 of tire 202 corresponding to tool 200.

Tread wear profile tool 200 may include at least one traction element wear gauge 228, as described above with respect to gauge 128.

As can be most easily viewed in FIG. 2B, two traction elements 208 oriented on each axial side of the leftmost groove 206 of tread 204 have experienced wear, and as a result, have a decreased radial height. The wear of those traction elements 208 has caused those traction elements 208 to recede radially away from the corresponding traction element measurement members 224, creating gaps 230 between those traction elements 208 and those members 224 when tool 200 is applied to tire tread 204. The presence of gaps 230 indicate to a user viewing tread wear profile tool 200 and tread 204 that those specific traction elements 208 have experienced wear. The radial height of a gap 230 is equal to the wear of the corresponding traction element 208 associated with that gap 230. This same concept may apply to tools 100, 300, 400, and 500 discussed above and below.

In one aspect, tread wear profile tool 200 may be used in conjunction with an electronic device or computing device, such as a computer or smartphone utilizing a camera and a program or application, with which the device may view gaps 230 using the camera and at least one of: (1) identify and record the presence of gaps 230 and thus wear of tread 204; (2) measure the radial height of gaps 230 (and thus radial wear of the corresponding traction element 208); (3) send a signal, message, email, notification, or the like to an owner, fleet manager, maintenance manager, or the like, indicating the presence and severity of gaps 230 and thus wear of tread 204; (4) compare the radial height of gaps 230 and thus level of wear of tread 204 with a predetermined value at which replacement of tire 202 is required, and notify a user as to at least one of: (a) the tread life remaining in tread 204 as a percentage of total tread life using the equation of (100−(height of gap 230/total height of traction element 208)×(100)), (b) that wear of tread 204 is approaching the predetermined value at which replacement of tire 202 is required, or (c) that wear of tread 204 has surpassed the predetermined value at which replacement of tire 202 is required; and (5) compare the radial height of gaps 230 to previous radial height of gaps 230 and thus determine the rate of wear of tread 204 and projected remaining life of tread 204 measured as a unit of time. Tool 200 may include one or more known dimensions for use in calibrating an electronic device, such as two points on tool 200 that are spaced apart by a distance known or entered into the program or application, against which the device can compare the radial height of a gap 230. This same concept may apply to tools 100, 300, 400, and 500 discussed above and below.

In another aspect, a user may visually observe tool 200 once it is in place on tread 204 and compare the radial height of traction elements 208 with traction element wear gauges 228. For example, as most easily viewed in FIG. 2B, the traction element 208 closest to the illustrated shoulder 210 has a height corresponding to the radially second linear marker (with the linear markers numbered beginning radially inwardly and increasing radially outwardly) of the leftmost wear gauge 228. The intermediate traction element 208 illustrated between two grooves 206 has an axially outer edge with a height corresponding to the radially second linear marker of the leftmost wear gauge 228, and an axially inner edge with a height corresponding to the radially fourth linear marker of the rightmost illustrated wear gauge 228. This same concept may apply to tools 100, 300, 400, and 500 discussed above and below.

By viewing the tread 204 and tool 200 illustrated in FIG. 2B, a user can easily determine that tread 204 is experiencing uneven wear on its axially outer edge, and particularly in its axially outer traction element 208 and the intermediate traction element 208 adjacent thereto. Where the traction elements 208 have a radial height corresponding to the radially second linear marker in the leftmost illustrated wear gauge 228, a user can see that tread 204 is approaching the end of its tread life, and will need to be replaced soon (where, for example, the radially first linear marker is an indicator of the minimal safe traction element 208 height). This same concept may apply to tools 100, 300, 400, and 500 discussed above and below.

Figure 3:
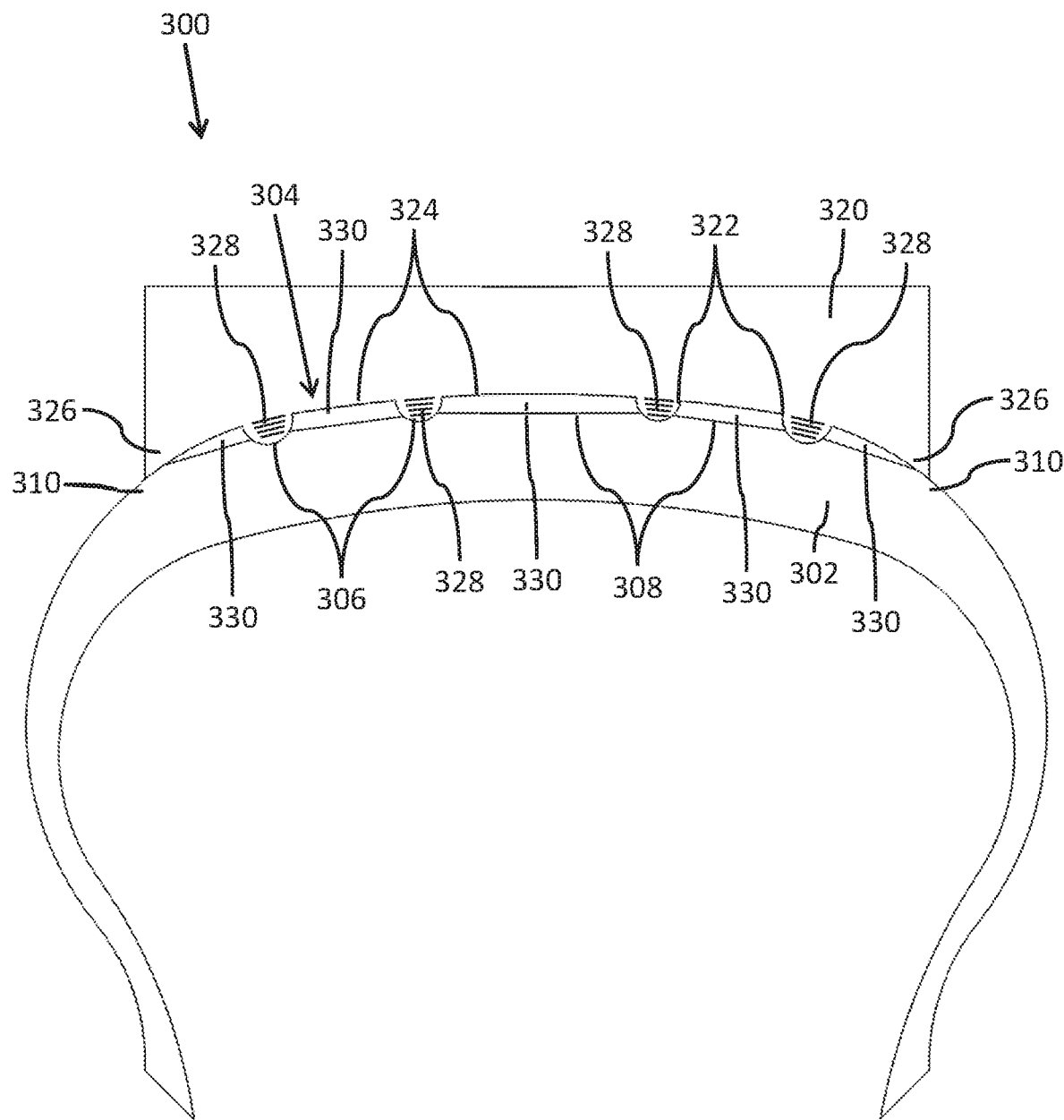
FIG. 3 illustrates a sectional view of a tread wear profile tool 300 oriented in contact with a tire 302.

FIG. 3 illustrates a tread wear profile tool 300 in use with a worn tire 302. The tread 304, and thus its profile, may include at least one groove 306, which may extend in a circumferential direction of tire 302, an axial direction of tire 302, or may extend in a direction biased from the circumferential and axial directions of tire 302. Tread 304, and thus its profile, may include at least one traction element 308, which may include a rib, block, or a combination of ribs and blocks. Tread 304, and thus its profile, includes two shoulders 310 oriented on the axially outer edges of tread 304.

Tread wear profile tool 300 may include a body 320 that may be a planar element or substantially planar element. One groove index member 322 may extend distally from body 320 for each groove 306 of tire 302 corresponding to tool 300. One traction element measurement member 324 may be oriented on the distal edge of body 320 for each traction element 308 of tire 302 corresponding to tool 300. Two shoulder index members 326 may extend distally from body 320 for each shoulder 310 of tire 302 corresponding to tool 300.

Tread wear profile tool 300 may include at least one traction element wear gauge 328, as described above with respect to gauge 128. As illustrated in FIG. 3, all traction elements 308 of tread 304 have experienced wear, and as a result, have a decreased radial height. The wear of traction elements 308 has caused traction elements 308 to recede radially away from the corresponding traction element measurement members 324, creating gaps 330 between those traction elements 308 and those members 324 when tool 300 is applied to tire tread 304. The presence of gaps 330 indicate to a user viewing tread wear profile tool 300 and tread 304 that traction elements 308 have experienced wear. The radial height of a gap 330 is equal to the wear of the corresponding traction element 308 associated with that gap 330.

In one aspect, tread wear profile tool 300 may be used in conjunction with an electronic device, as described above with respect to FIG. 2B.

In another aspect, a user may visually observe tool 300 once it is in place on tread 304 and compare the radial height of traction elements 308 with traction element wear gauges 328, as described above with respect to FIG. 2B.

For example, traction elements 308 have each experienced wear, which has decreased the radial height of traction elements 308. As illustrated, traction elements 308 have a radial height corresponding with the radially first linear marker of wear gauges 328. This wear of traction elements 308 would be an example of an even wear. Tread 304 may be at or near the end of its life where the radial height of traction elements 308 align with the radially first linear marker of wear gauges 328. As such, a user viewing tread wear profile tool 300 applied to tread 304 may observe that tire 302 will need to be replaced.

Figure 4A:
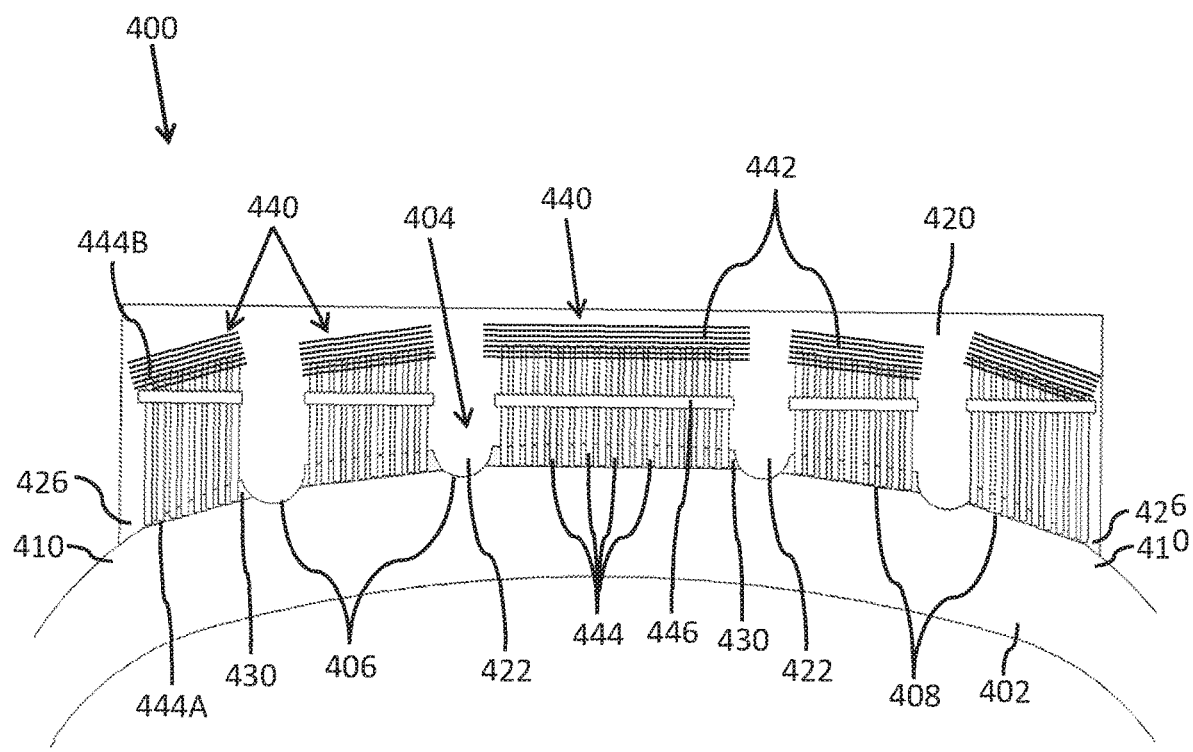
FIG. 4A illustrates a partial sectional view of a tread wear profile tool 400 oriented in contact with a tire 402.
Figure 4B:
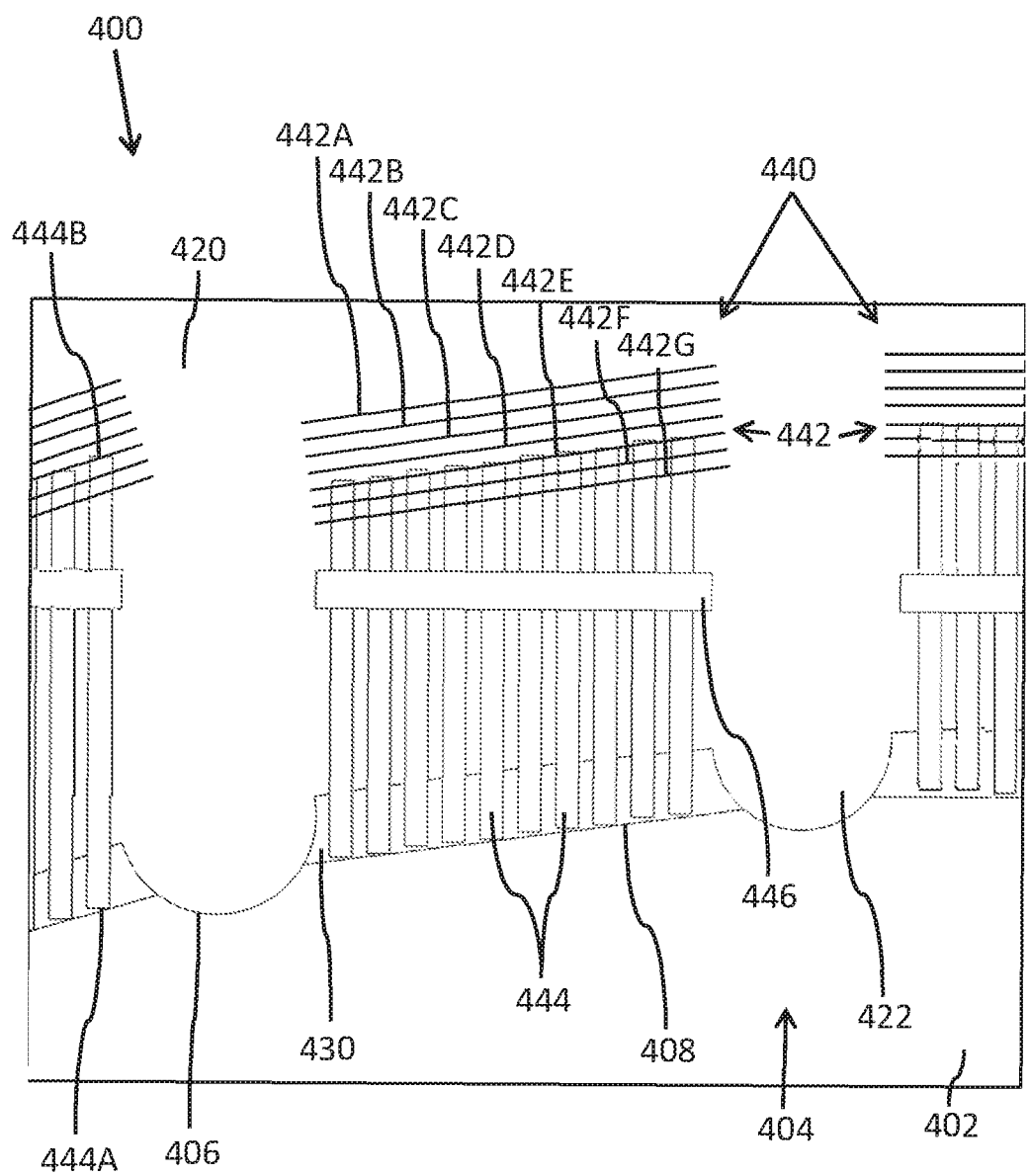
FIG. 4B illustrates a partial sectional view of a tread wear profile tool 400 oriented in contact with tire 402.
Figure 4C:
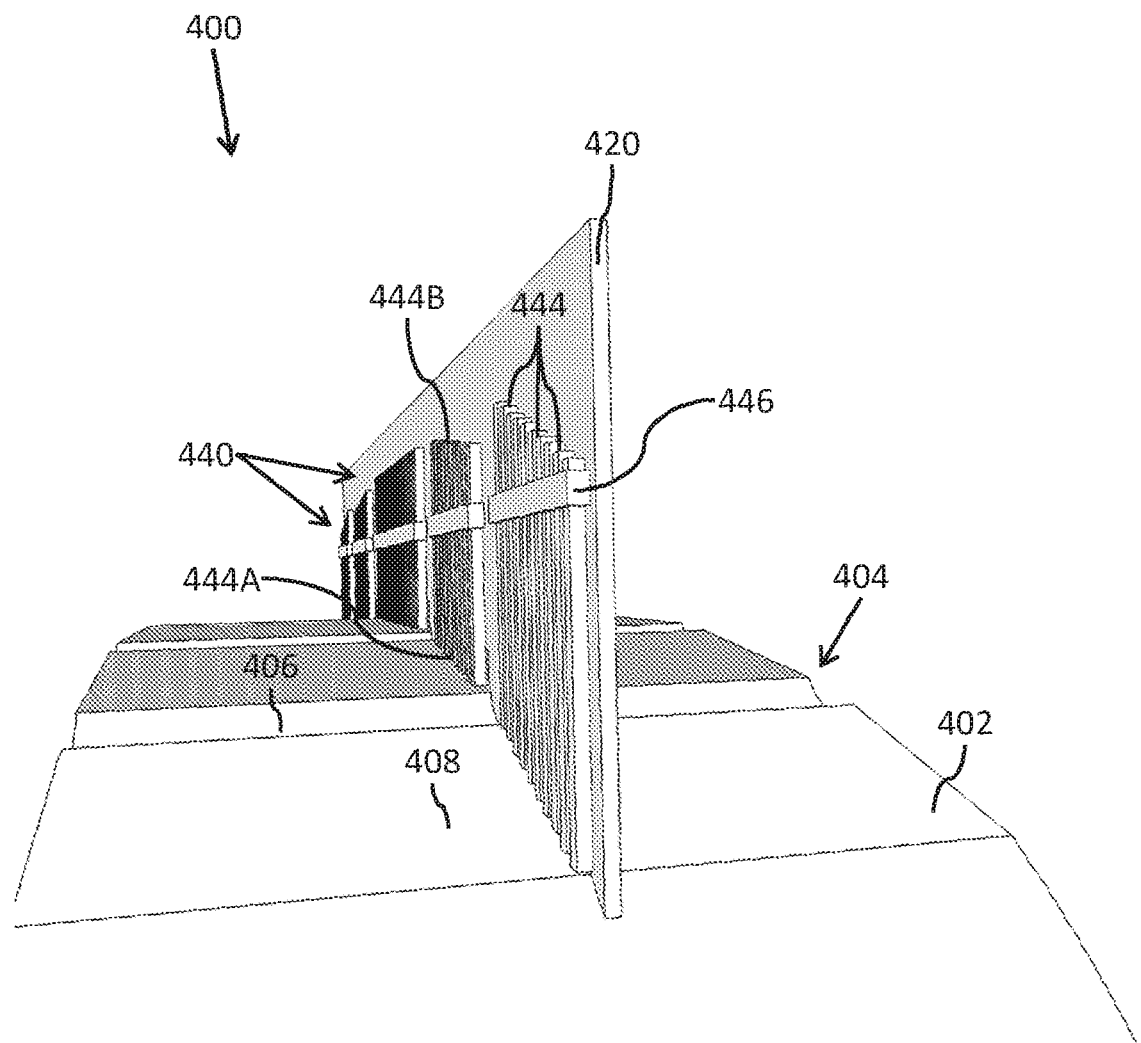
FIG. 4C illustrates a side perspective view of a tread wear profile tool 400 oriented in contact with tire 402.

FIGS. 4A-4C illustrate a tread wear profile tool 400 in use with a worn tire 402. The tread 404, and thus its profile, may include at least one groove 406, which may extend in a circumferential direction of tire 402, an axial direction of tire 402, or may extend in a direction biased from the circumferential and axial directions of tire 402. Tread 404, and thus its profile, may include at least one traction element 408, which may include a rib, block, or a combination of ribs and blocks. Tread 404, and thus its profile, includes two shoulders 410 oriented on the axially outer edges of tread 404.

Tread wear profile tool 400 may include a body 420 that may be a planar element or substantially planar element. One groove index member 422 may extend distally from body 420 for each groove 406 of tire 402 corresponding to tool 400. Two shoulder index members 426 may extend distally from body 420 for each shoulder 410 of tire 402 corresponding to tool 400.

Tread wear profile tool 400 may include at least one traction element wear finger 444. Finger(s) 444 may include a distal end 444A and a proximal end 444B. At least one finger 444 may include groups of fingers 444. At least one finger 444, or group of fingers 444, may be oriented to coincide laterally with each traction element 408. At least one finger 444, or group of fingers 444, may be oriented entirely radially above traction elements 408. Finger(s) 444 may extend radially and contact each traction element 408 at distal end 444A of each finger 444.

Finger 444 may be a substantially elongated element having a longitudinal length direction that extends parallel to body 420. Finger 444 may contact body 420 along one of its longitudinally extending sides, so as to provide additional rigidity to finger 444.

Finger 444 may be contained within a retention member 446 integrally or operatively connected to body 420. Retention member 446 may maintain one or more fingers 444 in a radially-extending orientation, while allowing finger 444 to slide longitudinally along finger 444's longitudinal axis, distally or proximally. Retention member 446 and/or finger (s) 444 may include a biasing element configured to bias finger(s) 444 distally without allowing finger 444 to extend completely out of retention member 446. Retention member 446 may maintain a plurality of fingers 444 in a spaced orientation. Retention member 446 may contain one or more fingers 444 corresponding to a particular traction element 408. Retention member 446 may extend across the length of body 420 and contain one or more fingers 444, each one or more fingers 444 corresponding to a particular traction element 408.

At least one wear gauge 440 may be oriented on body 420. Wear gauge 440 may include a plurality of radially-oriented markers 442. For example, markers 442 may be linear elements oriented substantially radially. As illustrated in FIGS. 4A and 4B, markers 442 may be biased to substantially match any angle in traction element 408.

As illustrated most clearly in FIGS. 4A and 4B, tread 404 may be worn such that traction elements 408 have receded radially inward. As a result, when a user places tool 400 on tread 404, indexing groove index members 422 in each groove 406, and shoulder index members 426 on each shoulder 410, gaps 430 may exist radially above traction elements 408.

Prior to placing tool 400 onto tread 404, a user may slide fingers 444 distally until proximal end 444B of each finger 444 is oriented radially aligned with, or radially inward of, the radially-innermost marker 442. With reference to FIG. 4B, wear gauge 440 includes a plurality of markers 442, identified as 442A-442G, with 442A being the radially-outermost marker and 442G being the radially-innermost marker. Thus, prior to applying tool 400 to tread 404, a user may slide fingers 444 longitudinally distally until proximal end 444B of each finger 444 is oriented so as to be radially aligned with, or radially inward of, marker 442G. Alternatively, fingers 444 may be biased longitudinally distally to a point where proximal end 444B of each finger 444 is oriented so as to be radially aligned with, or radially inward of, marker 442G.

With fingers 444 oriented as described, tool 400 is pressed radially inward onto tread 404 until indexing groove index members 422 are in complete contact with each groove 406, and/or shoulder index members 426 are in complete contact with each shoulder 410. As tool 400 is pressed radially inward, fingers 444 will contact traction element 408 at distal ends 444A, causing fingers 444 to move longitudinally proximally due to displacement by traction element 408. A user may observe where on gauge 440 and upon which marker 442A-442G proximal ends 444B are oriented after application of tool 400 to tread 404 to obtain an indication of wear of tread 404.

Fingers 444 may be made of a transparent material permitting a user to observe wear gauges 440 through fingers 444. Alternatively, fingers 444 may be translucent or opaque, and a user may simply observe the marker 442 nearest proximal end 444B when tool is applied to tread 404. Alternatively, fingers 444 may include slits or "windows" permitting a user to ascertain which marker 442 is nearest to proximal end 444B.

As can be most easily observed in FIG. 4B, fingers 444 have proximal ends 444B that fall nearest marker 442E, which is the radially third marker. In the example illustrated in FIG. 4B, tread 404 has worn more than half way through its radial height. A user may be able to readily ascertain via use of tool 400 the state of wear of traction elements 408, and determine necessary action to be taken (e.g., replacement of tire 402) or estimate the timing of a required replacement based upon the observed rate of wear of tread 404.

The proximal-most marker 442A may be oriented on body 402 at a point corresponding to proximal end 444B of finger 444 when tread 404 is new, and traction element 408 is unworn. In this manner, a user may view the position of proximal end 444B relative to marker 442A to determine how much of traction element 408 has worn away.

In one aspect, tread wear profile tool 400 may be used in conjunction with an electronic device, as described above with respect to FIG. 2B. In one aspect, tread wear profile tool 400 may be used in conjunction with an electronic device, such as a computer or smartphone utilizing a camera and a program or application, with which the device may view proximal end 444B of each finger 444 and compare proximal end 444B to markers 442 to identify which marker 442 is nearest proximal end 444B and at least one of: (1) identify and record the presence of gaps 430 and thus wear of tread 404 by comparing finger proximal ends 444B with markers 442 on gauge 440 (where proximal ends 444B are not aligned with proximal-most marker (e.g., marker 442A), traction element 408 is worn and gaps 430 exist); (2) measure the radial height of gaps 430 (and thus radial wear of the corresponding traction element 408) by comparing finger proximal ends 444B with markers 442 on gauge 440; (3) send a signal, message, email, notification, or the like to an owner, fleet manager, maintenance manager, or the like, indicating the presence and severity of gaps 430 and thus wear of tread 404 by comparing finger proximal ends 444B with markers 442 on gauge 440; (4) compare the radial height of gaps 430 (by comparing finger proximal ends 444B with markers 442 on gauge 440) and thus level of wear of tread 404 with a predetermined value above which wear of tread 404 is deemed unsafe or replacement of tire 402 is required, and notify a user as to at least one of: (a) the tread life remaining in tread 404 as a percentage of total tread life using the equation of ((number of markers 442 radially inward of finger proximal end 444B/total number of markers 442)×(100)), (b) that wear of tread 404 is approaching the predetermined value at which replacement of tire 402 is required (e.g., proximal end 444B is at or near a predetermined marker 442), or (c) that wear of tread 404 has surpassed the predetermined value at which replacement of tire 402 is required; and (5) compare the radial height of gaps 430 by comparing finger proximal ends 444B with markers 442 on gauge 440 to previous radial height of gaps 430 (via the same comparison) and thus determine the rate of wear of tread 404 and projected remaining life of tread 404 measured as a unit of time. Tool 400 may include one or more known dimensions for use in calibrating an electronic device, such as two points on tool 400 that are spaced apart by a distance known or entered into the program or application, against which the device can compare the radial height of a gap 430.

Where fingers 444 do not move freely in retention member 446, are not biased, and remain in position following application to tread 404, a user may be able to apply tool 400 to tread 404 at a specific circumferential point as discussed above, and remove tool 400 from tread 404 to observe the state of wear of traction elements 408 based upon the relative position of proximal ends 444B relative to markers 442. That is, a user may not need to actually observe tool 400 while tool 400 is applied to tread 404 ascertain the position of fingers 444 and wear of traction elements 408, but rather may be able to remove tool 400 from tread 404 and view fingers 444 from an area away from tire 402. This may be helpful as tires mounted on vehicles are often at least partially surrounded by fenders, which often do not provide significant space in which a user may place the user's head, or electronic device with a camera, for analysis of tread wear. The ability to remove tool 400 and view it outside of the tight confines of a fender or other vehicle body elements may be quite beneficial to a user.

As illustrated most clearly in FIG. 4C, fingers 444 may be retained in retention member 446, and may contact body 420 against most of one of finger 444's longitudinal sides. Retention member 446 may be integrally or operatively connected to body 420. Fingers 444 may be friction fit within retention member 446 in such a manner that a user may manipulate and easily move fingers longitudinally distally or proximally, but such that fingers 444 do not move in retention member 446 under their own weight.

At least one of distal end 444A and proximal end 444B may be enlarged or include a protrusion or other element to prevent finger 444 from passing through and out of retention member 446. Finger 444 may include an enlarged proximal end 444B that does not pass through and out of retention member 446, such that a user may extend finger 444 distally until the enlarged proximal end 444B contacts retention member 446, after which a user may apply tool 400 to tread 404 for measuring the wear of traction elements 408.

Figure 5:
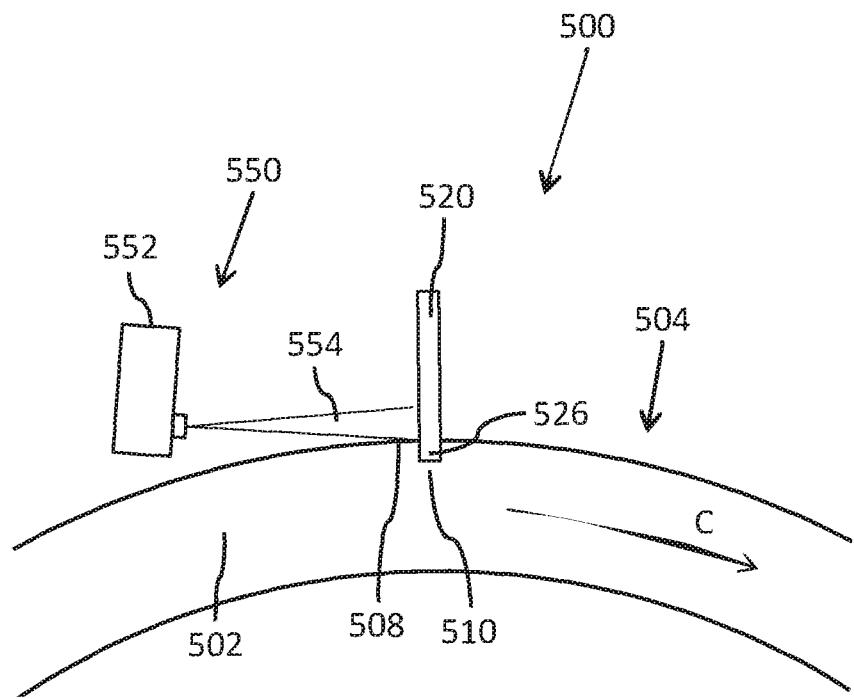
FIG. 5 illustrates a partial elevational view of a tread wear profile tool 500 oriented in contact with tire 502 and applied to analysis by an electronic computing device 550.

FIG. 5 illustrates a tread wear profile tool 500 oriented in contact with tire 502. Tire 502 may include a tire tread 504 having at least one traction element 508, and two shoulders 510.

Tool 500 may include a body 520. Two shoulder index members 526 may extend distally from body 520 for each shoulder 510 of tire 502 corresponding to tool 500.

An electronic computing device 550 may be used to analyze wear of tread 504 in conjunction with the use of tool 500. Device 550 may include a camera 552 used to obtain an image of tool 500 as applied to tread 504 (where tool 500 is the same style as tools 100-400 described above), or used to obtain an image of tool 500 with fingers that remain in place after application of the tool to tread 504 (where tool 500 is the same style as tool 400 described above), either while or after tool 500 is applied to tread 504.

Device 550 may include software capable of analyzing the obtained image to compare the position of traction elements relative to a wear gauge, such as gauges 128, 228, or 328, or the position of fingers 444 relative to wear gauge 440. The tread wear profile tools may include markings or dimensions that the software can use to analyze a known distance in the image and compare the known distance to the radial height of gaps in the case of tools 100-300. The software may analyze the proximal end of the fingers, in the case of tool 400, and identify the nearest marker 442 of gauge 440.

The obtained and analyzed image may include the entire profile of tread 504, such that the wear of each traction element may be analyzed at one time. The output of the software analysis may include wear of each individual traction element analyzed, an average wear of the tire, or both.

Camera 552 may obtain an image along the circumferential direction C of tire 502 and tread 504 as illustrated by field of view 554. As discussed above, device 550 may analyze the obtained image to determine tread wear and notify the user, fleet management, maintenance services, or any other concerned party authorized to receive information regarding tire 502.

Electronic computing device 550 may be a smartphone, and camera 552 may be an onboard camera within the smartphone. The software to analyze the obtained images may be an application downloaded by a user onto the smartphone.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available in tire manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A tread wear profile tool for determining wear of a tire, comprising:
   a body having:
      a substantially planar shape,
      at least one groove index member extending distally from the body,
         wherein the at least one groove index member includes at least one traction element wear gauge,
      at least one traction element measurement member oriented on a distal edge of the body, and
      a distal profile;
   a tire having:
      a tread having a radially outer profile, the tread having at least one groove, at least one traction element, and two shoulders; and
   wherein:
      the distal profile of the body is a negative of the radially outer profile of the tread.

2. The tread wear profile tool of claim 1, wherein the body includes one groove index member for each groove in the tread.

3. The tread wear profile tool of claim 1, wherein a distal end of the at least one groove index member contacts a radially inner portion of the at least one groove.

4. The tread wear profile tool of claim 1, wherein the body further comprises two shoulder index members extending distally from the body.

5. The tread wear profile tool of claim 4, wherein one of the two shoulder index members contacts one of the two shoulders, and wherein the other of the two shoulder index members contacts the other of the two shoulders.

6. The tread wear profile tool of claim 1, wherein the body includes one traction element measure member for each traction element in the tread.

7. The tread wear profile tool of claim 1, wherein the at least one traction element wear gauge includes a plurality of markers.

8. The tread wear profile tool of claim 1, wherein the at least one traction element wear gauge includes a series of linear elements spaced apart in a radial direction.

9. The tread wear profile tool of claim 1, wherein the tread has a unique radially outer profile at a particular circumferential location of the tire, and wherein the distal profile of the body is the negative of the unique radially outer profile at the particular circumferential location of the tire.

10. The tread wear profile tool of claim 1, wherein an entire distal edge of the tool is in contact with an entire radially outer profile of the tread when the tread is in an unworn state.

11. A tread wear profile tool for determining wear of a tire, comprising:
    a body having:
       a substantially planar shape,
       at least one groove index member extending distally from the body,
       at least one wear gauge;
    at least one traction element wear finger having a distal end and a proximal end,
       wherein the at least one traction element wear finger is an elongated element having a longitudinal length that extends parallel to the body,
       wherein the at least one traction element wear finger is contained within a retention member connected to the body, and
       wherein the at least one traction element wear finger slides longitudinally along a longitudinal axis of the at least one traction element wear finger; and
    a tire having:
       a tread having a radially outer profile, the tread having at least one groove, at least one traction element, and two shoulders.

12. The tread wear profile tool of claim 11, wherein the body includes one groove index member for each groove in the tread.

13. The tread wear profile tool of claim 11, wherein a distal end of the at least one groove index member contacts a radially inner portion of the at least one groove.

14. The tread wear profile tool of claim 11, wherein the body further comprises two shoulder index members extending distally from the body.

15. The tread wear profile tool of claim 14, wherein one of the two shoulder index members contacts one of the two shoulders, and wherein the other of the two shoulder index members contacts the other of the two shoulders.

16. The tread wear profile tool of claim 11, wherein the at least one wear gauge includes a plurality of markers.

17. The tread wear profile tool of claim 11, wherein the at least one wear gauge includes a series of linear elements spaced apart in a radial direction.

18. The tread wear profile tool of claim 11, wherein the tread has a unique radially outer profile at a particular circumferential location of the tire, and wherein the at least one groove index member extends into the grooves at the particular circumferential location of the tire.

19. The tread wear profile tool of claim 11, wherein the proximal end of the at least one traction element wear finger aligns with the at least one wear gauge.

20. The tread wear profile tool of claim 11, wherein the distal end of the at least one traction element wear finger contacts the at least one traction element.

* * * * *